Figure 1:
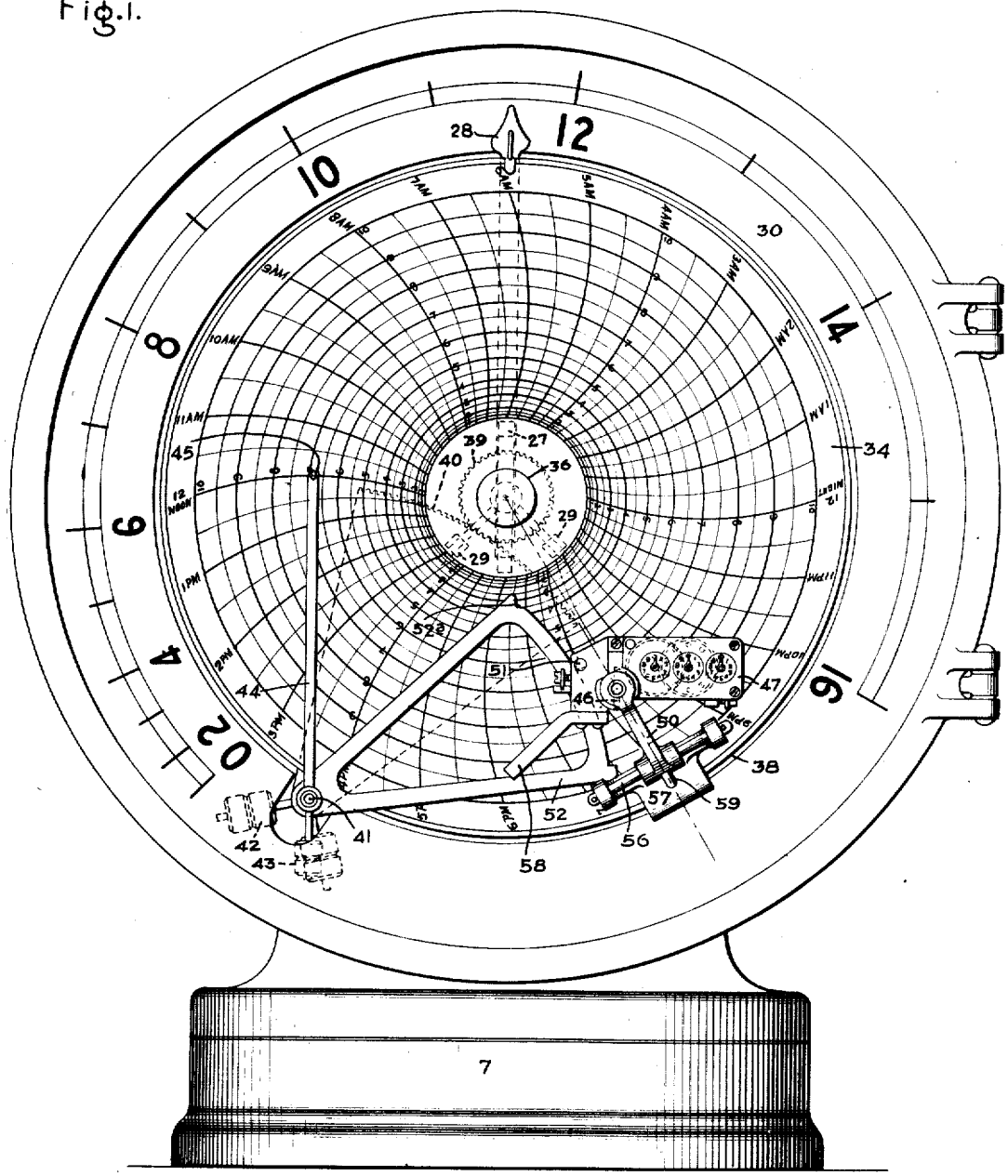

A. R. DODGE.
FLOW METER.
APPLICATION FILED JUNE 25, 1913.

1,118,403.

Patented Nov. 24, 1914.
3 SHEETS—SHEET 1.

Witnesses:
Marcus L. Byng.
J. Ellis Glen

Inventor:
Austin R. Dodge,
by
His Attorney.

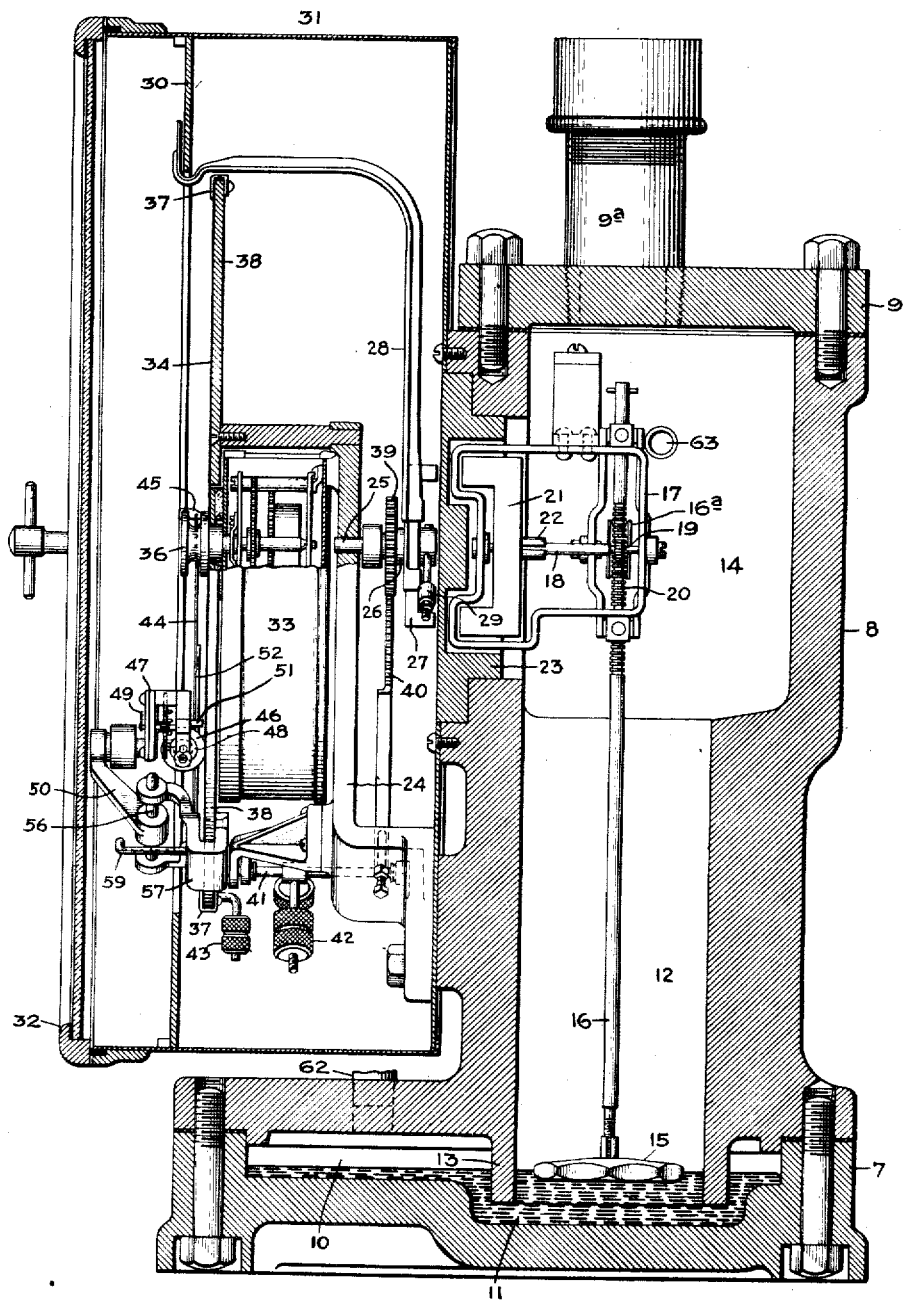

A. R. DODGE.
FLOW METER.
APPLICATION FILED JUNE 25, 1913.
1,118,403.
Patented Nov. 24, 1914.
3 SHEETS—SHEET 3.
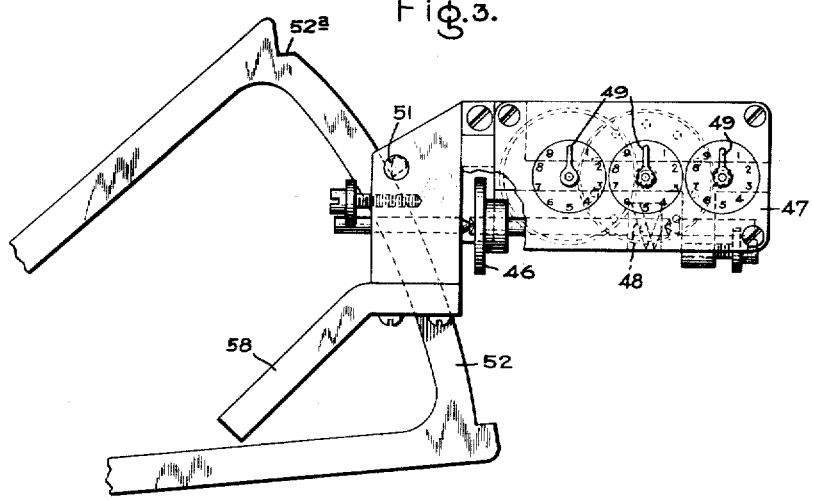
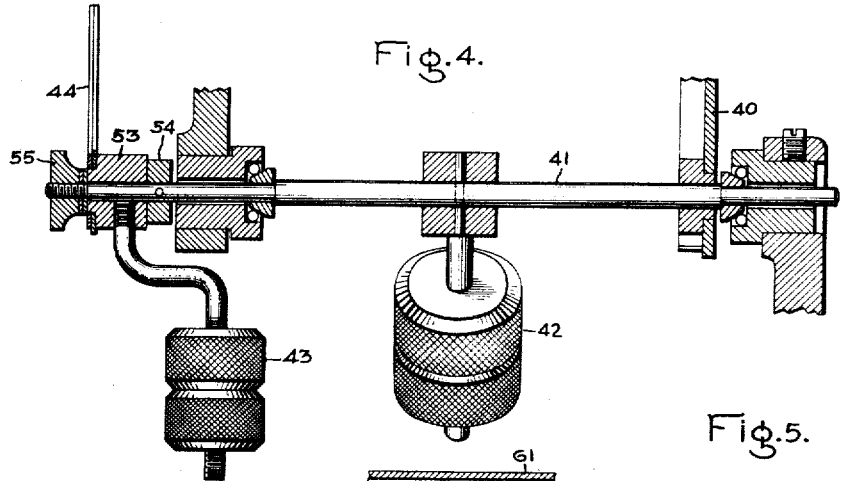
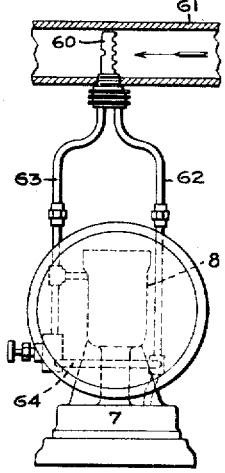
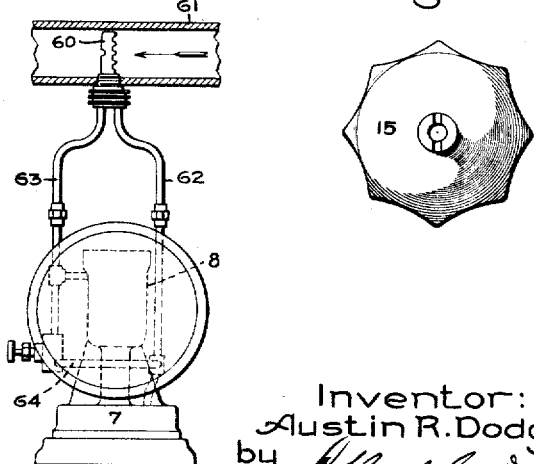
Witnesses:
Marcus L. Byng.
J. Ellis Glen
Inventor:
Austin R. Dodge,
by Albert G. Davis
His Attorney.

UNITED STATES PATENT OFFICE.

AUSTIN R. DODGE, OF SCHENECTADY, NEW YORK, ASSIGNOR TO GENERAL ELECTRIC COMPANY, A CORPORATION OF NEW YORK.

FLOW-METER.

1,118,403.   Specification of Letters Patent.   Patented Nov. 24, 1914.

Application filed June 25, 1913. Serial No. 775,620.

*To all whom it may concern:*

Be it known that I, AUSTIN R. DODGE, a citizen of the United States, residing at Schenectady, county of Schenectady, State of New York, have invented certain new and useful Improvements in Flow-Meters, of which the following is a specification.

This invention relates to meters for determining the flow of fluids, such for example, as steam, air, water, etc., and the object of the invention is the provision of a new and improved meter of relatively simple and substantial structure that effectively indicates, records and integrates the flow of the fluid, or performs any one or two of these functions, said meter as illustrated being actuated primarily by a pressure difference that bears a definite relation to the rate of flow, although the invention or some features of it can be applied to other types of meters.

For a more particular consideration of the meter and what in it is novel and my invention, reference should be had to the following description and claims.

In the drawings which illustrate one of the embodiments of the invention, Figure 1 is a front view of the meter as arranged to indicate, record and integrate the flow; Fig. 2 is a sectional side view of the meter shown in Fig. 1; Fig. 3 is a front view of the integrating mechanism with some portions of it broken away; Fig. 4 is an enlarged detail view of a spindle and its bearings, some of the parts being in section; Fig. 5 is a top view of the float used in the meter; and Fig. 6 is a diagrammatic view illustrating one manner in which the meter may be connected to the main or conduit through which the fluid to be metered is flowing.

The meter has a casing or body comprising a base 7, an upright member 8 and a cap 9. In the base is formed a reservoir 10 which is provided with a well 11 and contains mercury or some other suitable liquid. The member 8 has a cylindrical chamber 12 in it which communicates with the reservoir, the lower end of the chamber having a wall 13 that projects into the well 11. The liquid in the reservoir, well and chamber thus has substantially the form of a U-shaped column, although one end of the column is approximately annular while the other end is circular. The annular end has a larger area than the circular end, so that a relatively small movement of the annular end causes a much larger movement of the other end of the column. The upper part of the chamber 12 opens into an enlarged chamber 14 that is closed by the cover 9. Riding on the end of the liquid column in the chamber 12 is a float 15 that is mounted on the lower end of a rod 16. The edge of the float is longitudinally grooved being preferably engrailed as shown so that the surface tension of the liquid tends to keep the float in a central position in the chamber 12 and thus avoid the friction which might result from crowding the float to one side as it moves. Secured to the wall of the chamber 14 is a frame 17 in which is mounted a spindle 18. On the right end of the spindle, Fig. 2, is a pinion 19 that meshes with a circular rack 20 on the rod 16. The upper portion of the rod passes freely through openings in the frame 17, while a guide wheel 16ᵃ carried by the frame engages the rod opposite the pinion 19 and keeps the rack in mesh with the pinion. The structure just described permits the rack to swing freely and to turn but at the same time keeps it in engagement with the pinion. The cover 9 has a tubular extension 9ᵃ to permit the end of the rod 16 to pass up through the cover if the float rises sufficiently. The left end of the spindle 18 carries a U-shaped magnet 21 which is secured to it by a friction sleeve 22 so that the relation of the parts can be adjusted if desired. When the casing is made of iron or other magnetic material, a plug 23 of non-magnetic material is secured in the wall of the casing opposite the magnet. Mounted in the upper part of the bracket 24 attached to the front of the casing is a stud 25 that is arranged in axial alinement with the spindle 18. On the stud is a rotatable sleeve 26 carrying a U-shaped magnet 27 with its poles arranged opposite the poles of the magnet 21. The first magnet moves the second without any mechanical connection between them. This magnetic transmission mechanism obviates the use of a spindle passing through the wall of the casing which would have to be packed against leakage due to the higher pressure within the meter. The sleeve 26 also carries an indicator or pointer 28 and an adjustable weight 29 for balancing it. The outer end of the pointer is bent forward and upward to bring it into operative relation to a suitable scale or dial 30 arranged within the case 31 secured to the front of the casing or body of the meter. The front of the case is provided with a glazed door or cover 32. If the meter is merely to be used to indicate the instantaneous rate of flow of the fluid being metered, the apparatus described is sufficient for the purpose, although obviously when so used the scale might be moved back and the pointer made substantially straight, since it is bent as illustrated to carry it over parts of the recording and integrating mechanism.

A suitable clock mechanism 33 is attached to the bracket 24 and used for driving a chart or disk 34. The chart is located within the scale 30 and is secured to a rotating member of the clock by the nut 36, while its edge is guided by suitable devices 37 on a disk 38 carried by the bracket 24. The disk 38 also affords a backing or support for the chart.

The mechanism for transmitting the movements of the float and the magnets to the recording or integrating devices, or both, comprises a pinion 39 on the sleeve 26 that meshes with a sector gear 40 on a spindle 41 arranged parallel to and below the spindle 18. The spindle 41 is rotatably mounted in suitable bearings on the bracket 24 or the meter casing 8 and carries adjustable weights 42 and 43 for balancing the mass of the members mounted on it. On the outer end of the spindle is an arm 44 that is provided with a pen or marker 45 for making a record on the chart 34 as the latter rotates. If it is desired merely to indicate and record the flow of the fluid being metered, the mechanism just described is sufficient for that purpose. However, as has already been noted, the indicating mechanism can be used alone. Similarly the recording mechanism can be used alone, if preferred, by omitting the indicator and the scale.

The mechanism for integrating and registering the flow of fluid during a given period of time comprises an integrating or measuring wheel 46 arranged to be driven by the chart or disk 34 as the latter is rotated by the clock mechanism. The wheel 46 is on a spindle that is mounted in a frame 47, Fig. 3, and a spiral or worm gear 48 on the same spindle drives a train of gearing that actuates the counters 49 or similar devices. The frame 47 is rotatably mounted in the end of a radially disposed arm 50, the axis of rotation of the frame coinciding with the diameter of the wheel 46 which is normal to the face of the disk 34 at any instant. The frame 47 also carries a pin or follower 51 that engages the edge of a cam 52 mounted on the spindle 41. This arrangement reduces friction and the meter has to exert but a small force through the cam 52 to turn the wheel about its point of contact. In the form illustrated in Fig. 4, the cam and the pen arm are secured to a hub 53 that carries the balance weights 43 and the hub is clamped against a collar 54 by a nut 55. The arm 50 is on a spindle 56 that is mounted in a bracket 57 supported from the body of the meter. In Fig. 2, the bracket is shown secured to the rim of the disk 38, the outer portion of the bracket being arranged to clear the edge of the chart. A counterweight 58 acts to keep the follower 51 in contact with the cam 52. The center of gravity of the bracket and the parts of the integrating mechanism carried thereby has such a relation to the axis of the spindle 56 that the wheel 46 rests lightly against the face of the chart or disk. When removing or placing a chart the integrating mechanism can be swung outward about the axis of the spindle 56, the arm 50 then resting on a stop 59 which limits the outward movement.

When the flow is zero the pin 51 engages the portion 52ª at the upper end of the cam and the plane of the wheel 46 is radial. The movement of the chart imparts no rotation to the wheel in this position. When the fluid is flowing, the movement of the cam due to a change of flow moves the frame 47 and changes the angular relation of the plane of the wheel to the chart causing the latter to rotate the wheel correspondingly, the movement of the wheel being transmitted to the registering mechanism. The flow lines on the chart are unequally spaced, being closer together near the center, because the movement of the float does not bear the same ratio to the flow for all rates of flow, the movement being greater as the flow increases. The cam 52 is so shaped that it moves the wheel 46 in such a manner as to compensate for this variable ratio.

The integrating mechanism described can be used with the indicating and recording mechanisms or with either of them, or it can be used alone, the indicating and recording devices being omitted. When the integrating mechanism is used alone the wheel 46 will be driven by any suitable disk secured to a rotating member of the clock by the nut 36 or some similar device.

Fig. 6 illustrates one arrangement for connecting the meter to a main or conduit. A device 60 acting on the principle of a Pitot tube is inserted in the main or pipe 61. This device has a series of openings that face the column of fluid flowing through the main and a pressure due to the velocity head of said column is set up in them. This pressure is transmitted to the annular surface of the liquid in the reservoir 10 by the tube 62. The device 60 also has an opening or set of openings arranged to face in the direction of the flow or at some suitable angle to said direction. This second set of openings is connected by a tube 63 to the chambers 14 and 12 so that pressure is transmitted to the liquid in said chamber 12. A by-pass 64 affords means for equalizing the pressures on the ends of the substantially U-shaped column of liquid in the reservoir and the lower end of the chamber 12 when it is desired to adjust the meter. The pressure in the tube 62 will be greater than the static pressure of the fluid in the main by an amount that bears a definite relation to the velocity head of said fluid, while the pressure in the tube 63 will be said static pressure or a pressure slightly less. The device 60 thus creates a pressure difference having a definite relation to the rate of flow and the tubes 62 and 63 transmit this pressure difference to the ends of the column in the meter. As the column moves under the influence of said pressure difference the float 15 is correspondingly moved and its movements are transmitted by the mechanism previously described to the device or devices that show the flow. The pressure difference can be created by other devices than those shown. The tubes 62 and 63 can be connected to any of these last mentioned devices in a manner that will be apparent to those skilled in the art.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In a meter for measuring the flow of fluids, the combination of a main or conduit through which the fluid flows, integrating mechanism for determining the flow, said mechanism including a measuring wheel, a rotating disk, means for driving the disk, the rim of the wheel being in engagement with the face of the disk, and means responsive to the rate of flow in the main for turning the wheel about an axis coinciding with a diameter of said wheel.

2. In a meter for measuring the flow of fluids, the combination of a main or conduit through which the fluid flows, integrating mechanism for determining the flow, said mechanism including a measuring wheel, a rotating disk, means for driving the disk, the rim of the wheel being in engagement with the face of the disk, a shaft, a cam on the shaft for turning the wheel about an axis coinciding with a diameter of said wheel, and means responsive to the rate of flow in the main for turning said shaft.

3. In a meter for measuring the flow of fluids, the combination of a main or conduit through which the fluid flows, a casing containing a column of liquid that moves as the flow varies, means connecting the main and the casing, a float that rides on the liquid, a device for showing the flow, and means for transmitting motion from the float to the device including a rotatable spindle mounted within the casing, a pinion on the spindle, a rod connected to the float, a circular rack on the rod that engages the pinion, means for guiding the rod, a rotatable member mounted outside of the casing with its axis in alinement with the axis of the spindle, magnetic means for transmitting motion from the spindle to the member, a pinion carried by the rotatable member, a second spindle parallel to the first, and a gear on the second spindle that meshes with the last mentioned pinion.

4. In a meter for measuring the flow of fluids, the combination of a main or conduit through which the fluid flows, a chambered casing containing a substantially U-shaped column of liquid in its lower portion that moves as the flow varies, means connecting the casing and the main, a float that rides on one end of the column, the periphery of the float being grooved, a device for showing the flow, and means for transmitting motion from the float to the device comprising a rod that is connected to the float and extends upwardly therefrom, a circular rack on the rod, a frame mounted in the upper part of the casing, a spindle rotatably mounted in the frame, a pinion on the spindle that engages the rack, a guide wheel for the rod that is carried by the frame and keeps the rack in mesh with the pinion, a magnet on the spindle, a magnet rotatably mounted outside of the casing and arranged opposite the first magnet, a pinion that rotates with the second magnet, a sector gear that meshes with the pinion, and a spindle on which the sector is mounted.

5. In a meter for measuring the flow of fluids, the combination of a main or conduit through which the fluid flows, a chambered casing containing a substantially U-shaped column of liquid that moves as the flow varies, means connecting the casing and the main, a float that rides on one end of the column, a spindle mounted in the upper part of the casing, a pinion on the spindle, a rod connected to the float, a circular rack on the rod that engages the pinion, a rotatable member mounted outside of the casing, magnetic means for transmitting motion from the spindle to the member, an indicator that is moved by the member, and a scale that coöperates with the indicator.

6. In a meter for measuring the flow of fluids, the combination of a main or conduit through which the fluid flows, a casing containing a column of liquid in its lower portion that moves as the flow varies, means connnecting the main and the casing, a float that rides on one end of the column, a spindle mounted in the upper part of the casing, means for transmitting motion from the float to the spindle, a rotatable member mounted on the outside of the casing with its axis in alinement with the axis of the spindle, magnetic means for transmitting motion from the spindle to the member, an indicator carried by the member, a scale that coöperates with the indicator, a pinion on the member, a second spindle parallel to the first, a gear on the second spindle that is driven by the pinion, a marker mounted on the second spindle, and a chart with which the marker coöperates.

7. In a meter for measuring the flow of fluids, the combination of a main or conduit through which the fluid flows, a chambered casing containing a substantially U-shaped column of liquid in its lower portion that moves as the flow varies, means connecting the main and the casing, a float that rides on one end of the column, a spindle mounted in the upper part of the casing, means for transmitting motion from the float to the spindle, a magnet on the spindle, a rotatable member mounted outside of the casing with its axis in alinement with the axis of the spindle, a magnet on the member that is moved by the first magnet, an indicator that is moved by said member, a scale that coöperates with the indicator, a pinion on the member, a spindle having its axis parallel to the axis of the rotatable member, a gear on the second spindle that is driven by the pinion, a marker mounted on the second spindle, a chart with which the marker coöperates, an integrating mechanism, and means mounted on the second spindle for controlling the integrating mechanism.

8. In a meter for measuring the flow of fluids, the combination of a main or conduit through which the fluid flows, integrating mechanism for determining the flow, said mechanism including a measuring wheel, a rotating disk, means for driving the disk, the rim of the wheel being in engagement with the face of the disk, and means responsive to the rate of flow in the main that turns the wheel about an axis coinciding with a diameter of said wheel, said means including a cam arranged parallel to the face of the disk.

9. In a meter for measuring the flow of fluids, the combination of a main or conduit through which the fluid flows, a casing for the meter, a frame rotatably mounted on the casing registering mechanism carried by the frame and including a rotatable measuring wheel, the axis of rotation of the frame coinciding with a diameter of the wheel and being perpendicular to the frame, a rotatable member with which the rim of the wheel engages, means for rotating the member, and means responsive to the rate of flow through the main that turns the frame and the wheel about said axis of rotation as the flow varies.

10. In a meter for measuring the flow of fluids, the combination of a main or conduit through which the fluid flows, a casing for the meter, a rotatable disk carried by the casing, means for driving the disk, a frame rotatably mounted on the casing, registering mechanism carried by the frame and including a measuring wheel that engages the face of the disk, a rotatable spindle mounted on the casing with its axis perpendicular to the face of the disk, a cam on the spindle that engages the frame and turns it about its axis of rotation, and means responsive to the rate of flow of the fluid that actuates the spindle and cam.

11. In a meter for measuring the flow of fluids, the combination of a main or conduit through which the fluid flows, a casing for the meter, a rotating disk, means for driving the disk, an arm on the casing adjacent to the edge of the disk, a frame arranged parallel to the face of the disk and rotatably mounted in the arm with its axis of rotation perpendicular to said face, registering mechanism carried by the frame and including a measuring wheel that engages the face of the disk, a rotatable spindle mounted on the casing adjacent the edge of the disk with its axis perpendicular to the face of the disk, a cam on the spindle that extends over the face of the disk in parallel relation thereto, a follower on the frame that engages the cam, and means responsive to the rate of flow that actuates the spindle and cam.

12. In a meter for measuring the flow of fluids, the combination of a main or conduit through which the fluid flows, a casing for the meter, a rotating disk, means for driving the disk, an arm pivotally mounted on the casing, a frame rotatably mounted in the arm, registering mechanism carried by the frame and including a measuring wheel that engages the face of the disk, and means responsive to the rate of flow that moves the frame about its axis of rotation.

13. In a meter for measuring the flow of fluids, the combination of a main or conduit through which the fluid flows, a casing for the meter, a vertically arranged rotating disk, means for driving the disk, an arm pivotally mounted on the casing adjacent to the edge of the disk, a frame rotatably mounted on the arm with its axis of rotation perpendicular to the face of the disk, registering mechanism carried by the frame and including a measuring wheel that engages the face of the disk, the axis of rotation of the frame coinciding with a diameter of the wheel and the wheel being normally held against the disk by the action of gravity on the arm and the parts carried by it, a cam for moving the frame and wheel about said axis that is rotatably mounted on the casing and arranged parallel to the face of the disk, and means responsive to the rate of flow that moves the cam.

14. In a meter for measuring the flow of fluids, the combination of a main or conduit through which the fluid flows, a casing for the meter, a rotating disk or chart mounted on the casing, means for driving the disk, a frame rotatably mounted on the casing, registering mechanism carried by the frame and including a measuring wheel that engages the disk, a rotatable spindle mounted on the casing, a cam on the spindle for moving the frame and the wheel, a marker on the spindle that coöperates with the shart, and means responsive to the rate of flow that moves the spindle.

In witness whereof, I have hereunto set my hand this 23rd day of June, 1913.

AUSTIN R. DODGE.

Witnesses:
BENJAMIN B. HULL,
HELEN ORFORD.

It is hereby certified that in Letters Patent No. 1,118,403, granted November 24, 1914, upon the application of Austin R. Dodge, of Schenectady, New York, for an improvement in "Flow-Meters," an error appears in the printed specification requiring correction as follows: Page 5, line 18, for the word "shart" read *chart;* and that the said Letters Patent should be read with this correction therein that the same may conform to the record of the case in the Patent Office.

Signed and sealed this 5th day of January, A. D., 1915.

[SEAL.]
R. F. WHITEHEAD,
*Acting Commissioner of Patents.*